(12) United States Patent
Post et al.

(10) Patent No.: US 9,477,590 B2
(45) Date of Patent: Oct. 25, 2016

(54) WEAVE SEQUENCE COUNTER FOR NON-VOLATILE MEMORY SYSTEMS

(75) Inventors: Daniel J. Post, Cupertino, CA (US); Nir Jacob Wakrat, Los Altos, CA (US); Vadim Khmelnitsky, Foster City, CA (US)

(73) Assignee: APPLE INC., Cupertino, CA (US)

( * ) Notice: Subject to any disclaimer, the term of this patent is extended or adjusted under 35 U.S.C. 154(b) by 1322 days.

(21) Appl. No.: 13/234,984

(22) Filed: Sep. 16, 2011

(65) Prior Publication Data

US 2013/0073788 A1    Mar. 21, 2013

(51) Int. Cl.
*G06F 12/02*    (2006.01)

(52) U.S. Cl.
CPC ... *G06F 12/0246* (2013.01); *G06F 2212/7202* (2013.01); *G06F 2212/7207* (2013.01); *G06F 2212/7211* (2013.01)

(58) Field of Classification Search
None
See application file for complete search history.

(56) References Cited

U.S. PATENT DOCUMENTS

| | | | |
|---|---|---|---|
| 5,727,150 A | 3/1998 | Laudon et al. | |
| 6,000,006 A * | 12/1999 | Bruce | G06F 11/1068 711/103 |
| 6,282,700 B1 | 8/2001 | Grover et al. | |
| 2005/0144361 A1 | 6/2005 | Gonzalez et al. | |
| 2006/0126390 A1 | 6/2006 | Gorobets et al. | |
| 2007/0245109 A1 | 10/2007 | Murillo et al. | |
| 2008/0034154 A1 | 2/2008 | Lee et al. | |
| 2011/0029724 A1* | 2/2011 | Conley | 711/103 |
| 2011/0035535 A1 | 2/2011 | Locasio et al. | |
| 2011/0055454 A1 | 3/2011 | Byom et al. | |
| 2011/0066790 A1 | 3/2011 | Mogul et al. | |

FOREIGN PATENT DOCUMENTS

| | | |
|---|---|---|
| JP | H07-182246 | 7/1995 |
| JP | 2007-517320 | 6/2007 |
| TW | 201109920 | 3/2011 |
| WO | 2007/056106 | 5/2007 |

* cited by examiner

*Primary Examiner* — Charles Rones
*Assistant Examiner* — Ryan Dare
(74) *Attorney, Agent, or Firm* — Van Court & Aldridge LLP

(57) ABSTRACT

Systems and methods are disclosed for providing a weave sequence counter ("WSC") for non-volatile memory ("NVM") systems. The WSC can identify the sequence in which each page of the NVM is programmed. The "weave" aspect can refer to the fact that multiple blocks can be open for programming at once, thus allowing the pages of these blocks to be programmed in a "woven" manner. Systems and methods are also disclosed for providing a host weave sequence counter ("HWSC"). Each time new data is initially programmed to the NVM, this data can be associated with a particular HWSC. The HWSC associated with the data may not change, even when the data is moved to a new page (e.g., for wear leveling purposes and the like). The WSC and HWSC may aid in, for example, performing rollback, building logical-to-physical mappings, determining static-versus-dynamic page statuses, and performing maintenance operations (e.g., wear leveling).

18 Claims, 8 Drawing Sheets

WEAVE SEQUENCE COUNTER FOR NON-VOLATILE MEMORY SYSTEMS

BACKGROUND OF THE DISCLOSURE

NAND flash memory, as well as other types of non-volatile memories ("NVMs"), are commonly used for mass storage. For example, consumer electronics such as portable media players often include flash memory to store music, videos, and other media.

An NVM can include multiple super blocks, where each super block can be organized into several blocks. Similarly, each block of the NVM can be organized into several pages. However, some information or statistics regarding the content of the NVM may be provided at a block-level "granularity." In other words, such information may only be available regarding the block as a whole, without providing particular information regarding individual pages within that block.

This block level granularity limits a NVM system's ability to weave data within the blocks in a manner that maintains data coherency. Without data coherency, certain NVM operations such as rollback, wear leveling, garbage collection may not be executable. Accordingly, what is needed is an ability to weave data within blocks in a coherent manner.

SUMMARY OF THE DISCLOSURE

Systems and methods are disclosed for providing a weave sequence counter ("WSC") for non-volatile memory ("NVM") systems. The WSC can identify the sequence in which each page of the NVM is programmed. The "weave" aspect can refer to the fact that two or more blocks can be open for programming at the same time, thus allowing the pages of these blocks to be programmed in a "woven" manner. The WSC may aid the NVM system, for example, in performing rollback operations and in rebuilding logical-to-physical table mappings.

Systems and methods are also disclosed for providing a host weave sequence counter ("HWSC"). Each time data is initially programmed to a page of the NVM (e.g., rather than being moved or rewritten for wear leveling purposes and the like), that page can be assigned a HWSC. Unlike the WSC which may be updated each time data is moved to a new page, the HWSC assigned to a particular set of data may not change. Thus, even when data is moved to a new page for wear leveling, garbage collection, and the like, the HWSC associated with that data can remain the same. The HWSC may aid the NVM system, for example, in determining the static-versus-dynamic status of pages and in performing wear leveling and garbage collection operations.

BRIEF DESCRIPTION OF THE DRAWINGS

The above and other aspects and advantages of the invention will become more apparent upon consideration of the following detailed description, taken in conjunction with accompanying drawings, in which like reference characters refer to like parts throughout, and in which.

DETAILED DESCRIPTION OF THE DISCLOSURE

Figure 1:
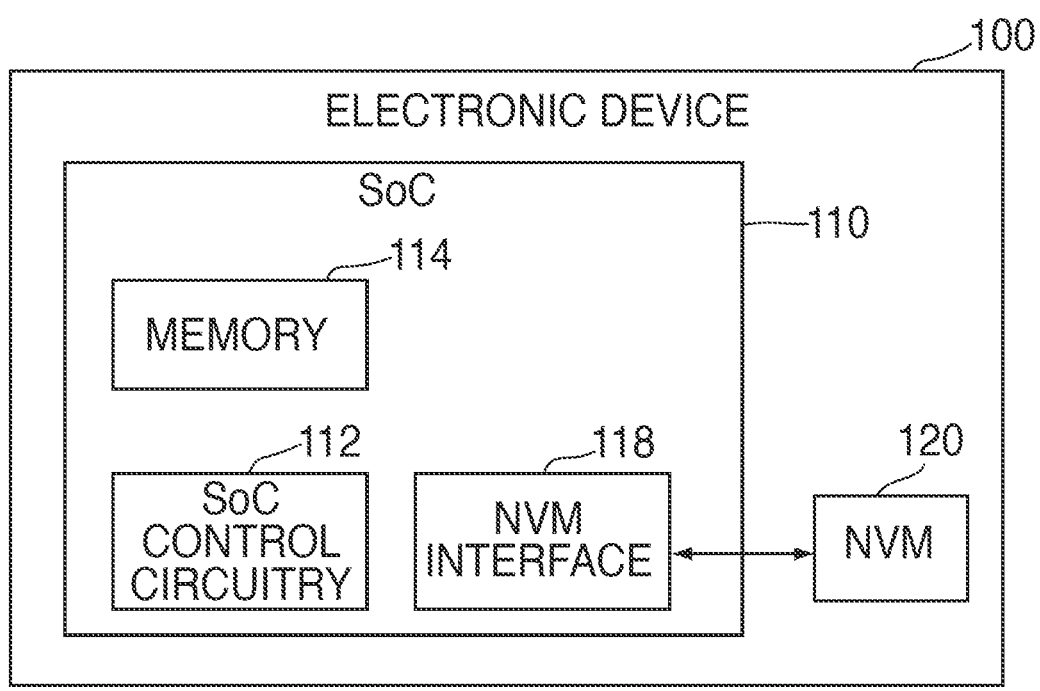
FIGS. 1 and 2 are block diagrams of electronic devices configured in accordance with various embodiments of the invention.

Systems and methods are disclosed for providing a weave sequence counter ("WSC") for non-volatile memory ("NVM") systems. The WSC can identify the sequence in which each page of the NVM is programmed. The "weave" aspect can refer to the fact that two or more blocks can be open for programming at the same time, thus allowing the pages of these blocks to be programmed in a "woven" manner.

In the event of an unclean shutdown or other system reboot event, the NVM system may need to rebuild one or more logical-to-physical mapping tables of the NVM. Moreover, this mapping table may include only valid (e.g., non-corrupted) data. During the rebuilding process, upon locating a corrupt page with invalid data, the NVM system may examine the WSC values in the pages of the blocks of the NVM to determine the particular WSC value of that corrupt page. The NVM system may then determine that any page having a WSC value greater than the WSC value of the corrupt page could not be adopted because it would be incoherent with respect to the file system and database journaling expectations. The NVM system may then "rollback" the system to a safe state by ignoring any such invalid pages and building the logical-to-physical mapping table using only pages having WSC values less than the WSC value of the corrupt page.

When logical-to-physical mapping tables are rebuilt, a time-order coherency is maintained. In some cases, the mapping table can be rebuilt by sequentially examining the pages in ascending order of WSC values. In the event that two pages each indicate they map to the same logical address, the page including the higher WSC value can be given priority and may override the other page. In other words, since the page with the higher WSC value was programmed to its logical address at a later point in time, it can be determined that this page includes the correct logical-to-physical mapping and should thus be used in the mapping table. Similarly, the page including the smaller WSC value may be determined to include an erroneous, outdated logical-to-physical mapping and thus should not be used in building the mapping table.

Systems and methods are also disclosed for providing a host weave sequence counter ("HWSC"). Each time data is initially written to a page of the NVM (e.g., rather than being moved or rewritten for wear leveling purposes and the like), that page can be assigned a HWSC. The HWSC can be set as the same value as the current WSC. Unlike the WSC which may be updated each time old data is moved to a new page, the HWSC assigned to a particular set of data may not change. As an example scenario, assume new data associated with logical block address ("LBA") X is stored at Page A. The current WSC is 23, and thus Page A is assigned WSC=23 and HWSC=23. At a later point in time when the current WSC value is now 82, the data associated with LBA X is moved to Page B (e.g., the data is moved for wear leveling, garbage collection, or the like). Page B is assigned new WSC=82 and maintains old HWSC=23.

In some embodiments, the HWSC can aid the NVM system in determining the static-versus-dynamic status of pages. In particular, the HWSC can provide a general idea of how old the data stored within a page is. When data is older, it may be more likely that such data can be considered static because it has not moved since it was originally programmed. Thus, the general age of data can be determined by calculating the difference between the current WSC value and the HWSC value associated with the page storing that data. If this difference is greater than a threshold value, then the data stored in that page can be considered static with respect to selecting which block or superblock for the data to be programmed to. If the difference is less than the threshold value, then the data stored within the page may, for example, be considered dynamic with respect to selecting which block or superblock for the data to be programmed to.

In some embodiments the static-versus-dynamic determination provided by the HWSC can aid the NVM system in performing maintenance operations such as wear leveling and garbage collection. In order to extend the lifespan of a NVM, it is preferable to have similar wear on all of the blocks of a NVM. Since static pages are generally not written and rewritten frequently, pages determined to be static can be stored together in a high-cycle block (e.g., a block which has already been erased and programmed a relatively large number of times). This can help reduce further wear on the high-cycle block by reducing the possibility that the block will be erased and reprogrammed in the future. Similarly, pages determined to be dynamic can be stored together in a low-cycle block (e.g., a block which has only been erased and programmed a relatively small number of times).

FIG. 1 illustrates a block diagram of electronic device 100. In some embodiments, electronic device 100 can be or can include a portable media player, a cellular telephone, a pocket-sized personal computer, a personal digital assistance ("PDA"), a desktop computer, a laptop computer, and any other suitable type of electronic device.

Electronic device 100 can include system-on-a-chip ("SoC") 110 and non-volatile memory ("NVM") 120. Non-volatile memory 120 can include a NAND flash memory based on floating gate or charge trapping technology, NOR flash memory, erasable programmable read only memory ("EPROM"), electrically erasable programmable read only memory ("EEPROM"), Ferroelectric RAM ("FRAM"), magnetoresistive RAM ("MRAM"), or any combination thereof.

NVM 120 can be organized into "blocks", which can the smallest erasable unit, and further organized into "pages", which can be the smallest unit that can be programmed or read. In some embodiments, NVM 120 can include multiple integrated circuits, where each integrated circuit may have multiple blocks. Memory locations (e.g., blocks or pages of blocks) from corresponding integrated circuits may form "super blocks". Each memory location (e.g., page or block) of NVM 120 can be referenced using a physical address (e.g., a physical page address or physical block address). Metadata such as ECC data (e.g., to provide for error detection and/or correction of the information stored in NVM 120), weave sequence counter values, and host weave sequence counters can be included in each page of NVM 120.

System-on-a-chip 110 can include SoC control circuitry 112, memory 114, and NVM interface 118. SoC control circuitry 112 can control the general operations and functions of SoC 110 and the other components of SoC 110 or electronic device 100. For example, responsive to user inputs and/or the instructions of an application or operating system, SoC control circuitry 112 can issue read or write requests to NVM interface 118 to obtain data from or store data in NVM 120. For clarity, data that SoC control circuitry 112 may request for storage or retrieval may be referred to as "user data", even though the data may not be directly associated with a user or user application. Rather, the user data can be any suitable sequence of digital information generated or obtained by SoC control circuitry 112 (e.g., via an application or operating system).

SoC control circuitry 112 can include any combination of hardware, software, and firmware, and any components, circuitry, or logic operative to drive the functionality of electronic device 100. For example, SoC control circuitry 112 can include one or more processors that operate under the control of software/firmware stored in NVM 120 or memory 114.

Memory 114 can include any suitable type of volatile memory, such as random access memory ("RAM") (e.g., static RAM ("SRAM"), dynamic random access memory ("DRAM"), synchronous dynamic random access memory ("SDRAM"), double-data-rate ("DDR") RAM), cache memory, read-only memory ("ROM"), or any combination thereof. Memory 114 can include a data source that can temporarily store user data for programming into or reading from non-volatile memory 120. In some embodiments, memory 114 may act as the main memory for any processors implemented as part of SoC control circuitry 112.

NVM interface 118 may include any suitable combination of hardware, software, and/or firmware configured to act as an interface or driver between SoC control circuitry 112 and NVM 120. For any software modules included in NVM interface 118, corresponding program code may be stored in NVM 120 or memory 114.

NVM interface 118 can perform a variety of functions that allow SoC control circuitry 112 to access NVM 120 and to manage the memory locations (e.g., pages, blocks, super blocks, integrated circuits) of NVM 120 and the data stored therein (e.g., user data). For example, NVM interface 118 can interpret the read or write requests from SoC control circuitry 112, perform wear leveling, perform garbage collection, generate read and program instructions compatible with the bus protocol of NVM 120, assign weave sequence counter values to pages, and assign host weave sequence counter values to pages.

While NVM interface 118 and SoC control circuitry 112 are shown as separate modules, this is intended only to simplify the description of the embodiments of the invention. It should be understood that these modules may share hardware components, software components, or both. For example, SoC control circuitry 112 may execute a software-based memory driver for NVM interface 118.

In some embodiments, electronic device 100 can include a target device, such as a flash memory drive or SD card, that includes NVM 120 and some or all portions of NVM interface 118. In these embodiments, SoC 110 or SoC control circuitry 112 may act as the host controller for the target device. For example, as the host controller, SoC 110 can issue read and write requests to the target device.

Figure 2:
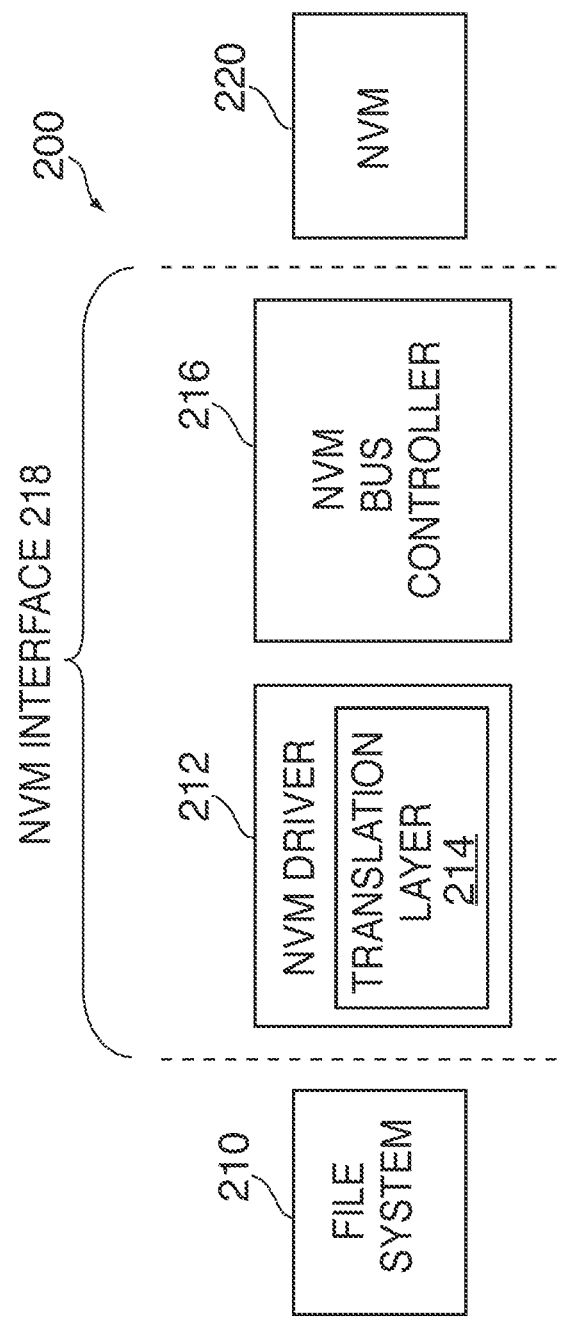

FIG. 2 illustrates a block diagram of electronic device 200, which may illustrate in greater detail some of the firmware, software, and/or hardware components of electronic device 100 (FIG. 1) in accordance with various embodiments. Electronic device 200 may have any of the features and functionalities described above in connection with FIG. 1, and vice versa. As shown, dashed lines demarcate the layers. It is understood that the depiction of which components fall within the demarcation lines are merely illustrative and that one or more components can be affiliated with a different layer.

Electronic device 200 can include file system 210, NVM driver 212, NVM bus controller 216, and NVM 220. In some embodiments, file system 210 and NVM driver 212 may be software or firmware modules, and NVM bus controller 216 and NVM 220 may be hardware modules. Accordingly, in these embodiments, NVM driver 212 may represent the software or firmware aspect of NVM interface 218, and NVM bus controller 216 may represent the hardware aspect of NVM interface 218.

File system 210 can include any suitable type of file system, such as a File Allocation Table ("FAT") file system or a Hierarchical File System Plus ("HFS+"), and may be part of the operating system of electronic device 200 (e.g., part of SoC control circuitry 112 of FIG. 1). In some embodiments, file system 210 may include a flash file system, which provides a logical-to-physical mapping of pages. In these embodiments, file system 210 may perform some or all of the functionalities of NVM driver 212 discussed below, and therefore file system 210 and NVM driver 212 may or may not be separate modules.

File system 210 may manage file and folder structures for the application and operating system. File system 210 may operate under the control of an application or operating system running on electronic device 200, and may provide write and read requests to NVM driver 212 when the application or operating system requests that information be read from or stored in NVM 220. Along with each read or write request, file system 210 can provide a logical address to indicate where the user data should be read from or written to, such as a logical page address or a logical block address with a page offset.

File system 210 may provide read and write requests to NVM driver 212 that are not directly compatible with NVM 220. For example, the logical addresses may use conventions or protocols typical of hard-drive-based systems. A hard-drive-based system, unlike flash memory, can overwrite a memory location without first performing a block erase. Moreover, hard drives may not need wear leveling to increase the lifespan of the device. Therefore, NVM interface 218 can perform any functions that are memory-specific, vendor-specific, or both to handle file system requests and perform other management functions in a manner suitable for NVM 220.

NVM driver 212 can include translation layer 214. In some embodiments, translation layer 214 may be or include a flash translation layer ("FTL"). On a write request, translation layer 214 can map the provided logical address to a free, erased physical location on NVM 220. On a read request, translation layer 214 can use the provided logical address to determine the physical address at which the requested data is stored. Because each NVM may have a different layout depending on the size or vendor of the NVM, this mapping operation may be memory and/or vendor-specific.

In addition to logical-to-physical address mapping, translation layer 214 can perform any other suitable functions that may be typical of flash translation layers, such as garbage collection ("GC") and wear leveling.

In some embodiments, NVM driver 212 may interface with NVM bus controller 216 to complete NVM access requests (e.g., program, read, and erase requests). Bus controller 216 may act as the hardware interface to NVM 220, and can communicate with NVM 220 using the bus protocol, data rate, and other specifications of NVM 220.

NVM interface 218 may manage NVM 220 based on memory management data, sometimes referred to herein as "metadata". The metadata may be generated by NVM driver 212 or may be generated by a module operating under the control of NVM driver 212. For example, metadata can include any information used for managing the mapping between logical and physical addresses, bad block management, wear leveling, ECC data used for detecting or correcting data errors, weave sequence counter values assigned to pages, host weave sequence counter values assigned to pages, or any combination thereof. The metadata may include data provided by file system 210 along with the user data, such as a logical address. Thus, in general, "metadata" may refer to any information about or relating to user data or used generally to manage the operation and memory locations of a non-volatile memory.

NVM interface 218 may be configured to store metadata in NVM 220. In some embodiments, NVM interface 218 may store metadata associated with user data at the same memory location (e.g., page) in which the user data is stored. For example, NVM interface 218 may store user data, the associated logical address, ECC data, a weave sequence counter value, and a host weave sequence counter value for the user data at one or more memory locations of NVM 220. NVM interface 218 may also store other types of metadata about the user data in the same memory location.

NVM interface 218 may store the logical address so that, on power-up of NVM 220 or during operation of NVM 220, electronic device 200 can determine what data resides at that location. In particular, because file system 210 may reference the user data according to its logical address and not its physical address, NVM interface 218 may store the user data and logical address together to maintain their association. This way, even if a separate table maintaining the logical-to-physical mapping in NVM 220 becomes outdated, NVM interface 218 may still determine the proper mapping at power-up or reboot of electronic device 200, for example.

In addition to the logical-to-physical address mapping, translation layer 214 can perform any of the other functions that may be typical of flash translation layers, Such as garbage collection and wear leveling. For example, translation layer 214 can perform wear leveling to provide for similar wear on all blocks of NVM 220.

As mentioned previously, the blocks of NVM 220 can generally be erased an entire block at a time, while the individual pages of each block can be programmed one page at time. A page of NVM 220 may be programmed with data when, for example, new data is initially saved in NVM 220 (e.g., when a new song file is first saved into a portable media player device) or when old data is moved to a different page (e.g., when previously-saved data is moved for wear leveling, garbage collection, or other maintenance operations). Accordingly, as used herein, the term "new data" can refer to data being initially programmed in an NVM for a first time while the term "old data" can refer to data which was previously programmed in the NVM and is moved (e.g., reprogrammed) from one area of the NVM to another. Each time data is saved into a page of NVM 220

(e.g., whether this data is old or new) that page can be associated with a sequentially incremented weave sequence counter ("WSC") value.

Each page can include a metadata field that stores its associated WSC value. Every time another page is programmed with data, the WSC can be incremented and the newly-incremented WSC value can be stored in that page's metadata. In this manner, the WSC can represent a counter number which identifies the relative order in which each page of NVM 220 has been programmed. As an illustration, assume Page A is programmed with data when the current WSC value is equal to 2. WSC=2 is thus stored in the metadata of Page A, and the current WSC value is incremented to 3. Page B is next programmed with data, and thus WSC=3 is stored in the metadata of Page B. Storing and/or control of the WSC can be performed by any suitable component of the NVM system such as, for example, by an NVM interface (e.g., NVM Interface 118 of FIG. 1) or suitable control circuitry (e.g., SoC Control Circuitry 112 of FIG. 1).

Figure 3:
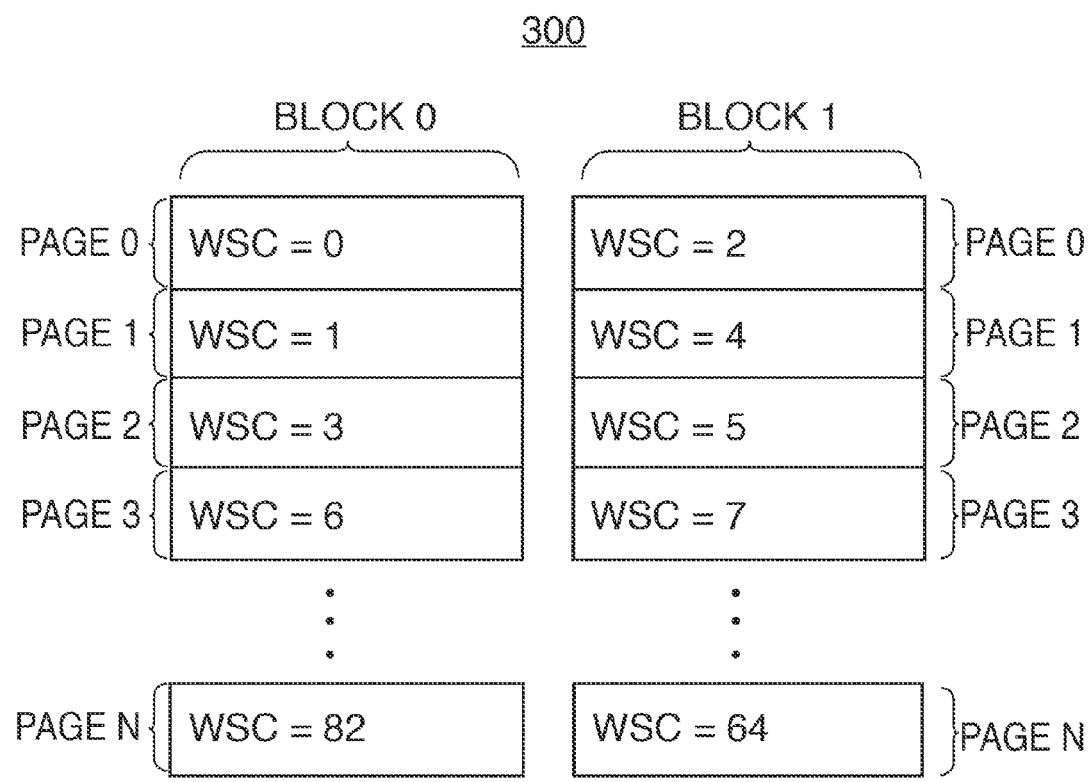
FIG. 3 is a functional view of blocks of an NVM being woven in accordance with various embodiments of the invention.

The "weave" aspect of the weave sequence counter can refer to the fact that two or more blocks of NVM 220 can be open for programming at the same time, thus allowing the pages of these blocks to be programmed in a "woven" manner. For example, FIG. 3 illustrates a functional view of NVM system 300 in which two blocks are open for programming at the same time. As illustrated by FIG. 3, Pages 0 and 1 of Block 0 are programmed first, and thus are assigned WSC=0 and WSC=1, respectively. Page 0 of Block 1 is next programmed, and thus is assigned WSC=2. Page 2 of Block 0 is then programmed, and thus is assigned WSC=3, and so forth. Thus, as is illustrated by FIG. 3, the pages of Blocks 0 and 1 are programmed in a woven manner, where the WSC values can indicate the order in which these pages were programmed. Although FIG. 3 illustrates a case where two blocks are open for programming at the same time, one skilled in the art could appreciate that any number of two or more blocks could be open for programming at the same time and woven in this manner.

In some embodiments, the WSC may rollover after a certain number of write cycles. For example, the WSC may reset back to WSC=0 after 100,000,000 write cycles. If there is roll over, various algorithms can detect large gaps and infer that the small value counter is actually greater than larger counter values that may exist on the NMM. In some embodiments, the WSC counter can be set to a size large enough so it does not roll over during the rated lifecycle of the NVM. Moreover, the WSC can be impartial as to the data being written. For example, the WSC can continue to increment and assign its current value to the metadata of the page currently being programmed, regardless of whether that page is being written with new data or being written with old data.

In some embodiments, the WSC can aid in the performance of various NVM operations. For example, the WSC can be used during rollback of an NVM system. After an unclean shutdown of the NVM, the NVM system (e.g., one or more components of the NVM system such as NVM interface 118 of FIG. 1 or NVM interface 218 of FIG. 2) may attempt to rebuild the logical-to-physical mappings table between logical addresses used by a file system (e.g., file system 210 of FIG. 2) and physical addresses of the NVM (e.g., NVM 220 of FIG. 2). However, the unclean shutdown may result in various pages of data becoming invalid. Generally, when one page becomes invalid, it is assumed that any pages subsequently programmed are also invalid because it would be incoherent with respect to the file system and database journaling expectations. The NVM system should preferably rebuild the logical-to-physical mapping table using only the valid data existing before such corruption occurred. In other words, the NVM system should "rollback" the system to a stable point in time when the data is still error-free.

Figure 4:
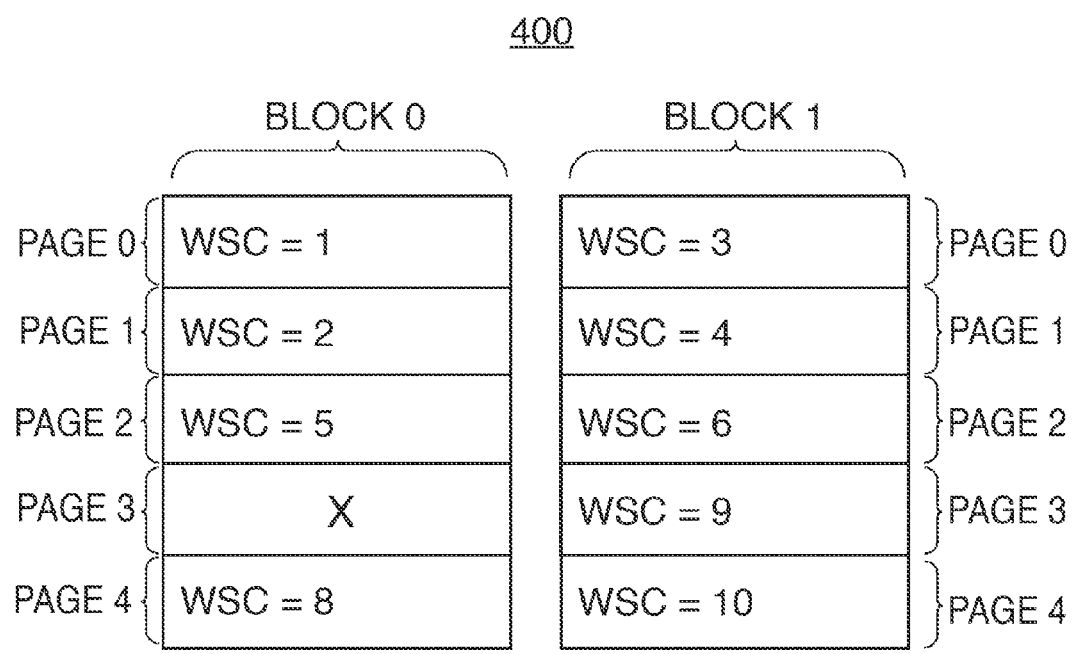
FIG. 4 is a function view of blocks of an NVM during a rollback operation in accordance with various embodiments of the invention.

The WSC can aid in determining how to suitably rollback the NVM system. In particular, due to the woven nature of the programmed pages, it can be insufficient to merely rollback a single block in a serial manner to a corrupted page. Rather, several blocks may need to be rolled back at the same time in order to properly return the system to an error-free state. The WSC can help determine how to rollback each of these woven blocks. For example, FIG. 4 shows a functional view of NVM system 400 in which pages have become corrupted from an unclean shutdown. Although FIG. 4 only illustrates two blocks of NVM system 400, one skilled in the art could appreciate that this illustration could be extrapolated to include any suitable number of two or more blocks.

As indicated by the WSC values in FIG. 4, the pages of Blocks 0 and 1 have been programmed in a woven manner. However, due to an unclean shutdown of NVM system 400, Page 3 of Block 0 has become corrupted and is now invalid or uncorrectable (e.g., as indicated by the "X" symbol). NVM system 400 (e.g., one or more components of NVM system 400 such as NVM interface 118 of FIG. 1 or NVM interface 218 of FIG. 2) may discover such a corrupt page when, for example, examining Block 0 during the rebuilding of a logical-to-physical mapping table of NVM system 400. Within Block 0, Pages 0-2 are located before Page 3, and thus NVM system 400 may determine that Pages 0-2 are likely error free (e.g., since they are located before the corruption occurred). Similarly, NVM system 400 may determine that Page 4 of Block 0 is likely corrupted since it is located after corrupt Page 3 (e.g., since any pages programmed after a corrupt page may also generally be corrupt). However, in order to determine which pages of other blocks (e.g., Block 1) are error-free and which pages are corrupt, NVM system 400 may rely upon examining the WSC values of the NVM's pages.

For example, NVM system 400 can examine the metadata of the pages in Block 0 (e.g., Pages 0-2, which are likely coherent since they are located before corrupt Page 3) to determine they are associated with WSC=1, 2, and 5. NVM system 400 can then examine the metadata of the pages in Block 1 to determine that Pages 0-2 are associated with WSC=3, 4, and 6. Since all these pages occur without any gaps in the WSC values (e.g., the WSC values go from 0 to 6 without any gaps in the sequence), NVM system 400 can determine that all these pages are likely coherent. However, the next value detectable in the weave sequence counter is WSC=8, associated with page 8 of Block 0. Since WSC=7 is not detected, thus resulting in a gap in the weave sequence counter, NVM system 400 may determine that WSC=7 is the WSC value associated with corrupt Page 3 of Block 0. NVM system 400 may then determine that any pages in the NVM associated with a WSC value greater than 7 are likely corrupted. In other words, Page 4 of Block 0 (associated with WSC=8) and Pages 3-4 of Block 1 (associated with WSC=9 and 10) are likely corrupted.

Figure 5:
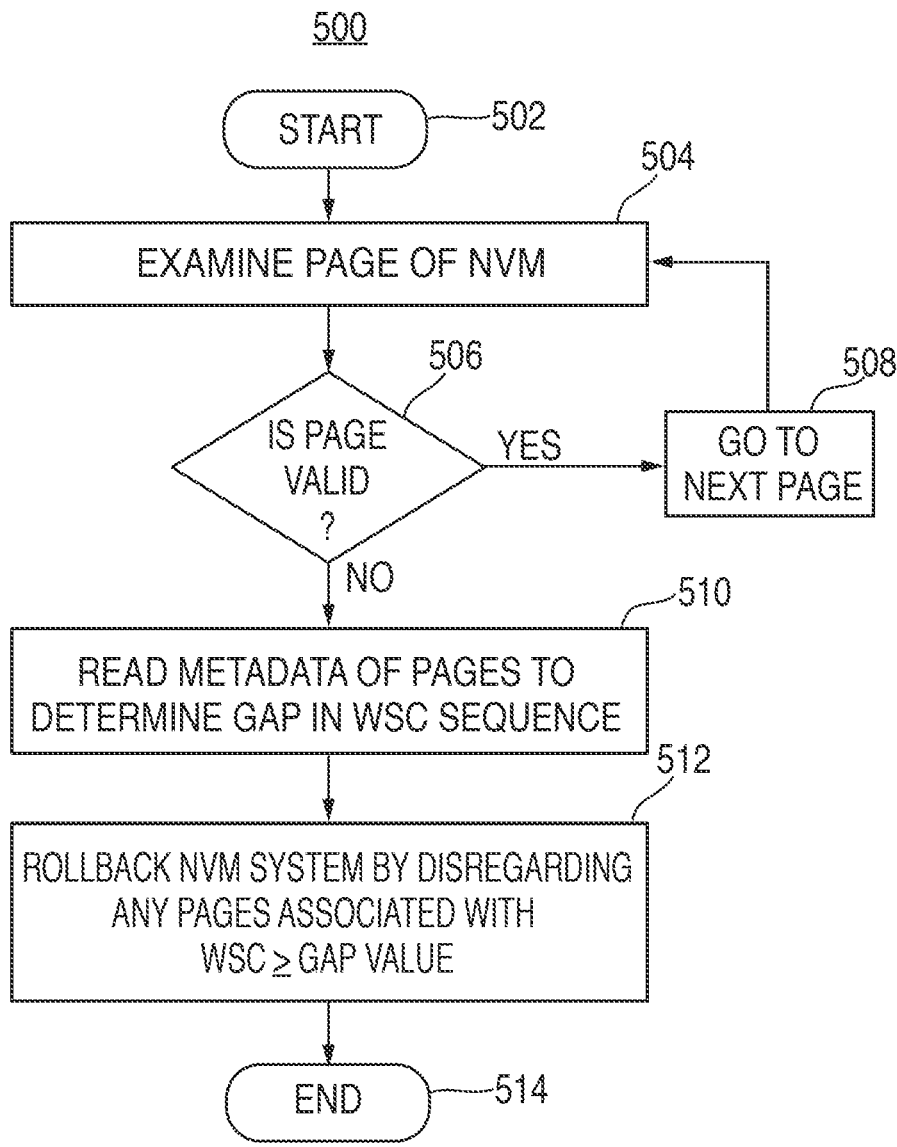
FIG. 5 is a flowchart of a rollback operation using weave sequence counters in accordance with various embodiments of the invention.

In this manner, by locating a gap in the weave sequence counter, an NVM system can identify a corrupt page where corruption from an unclean shutdown likely started. The NVM system may then rollback the system by disregarding any pages associated with a WSC value greater than the WSC value of the corrupt page. For example, these pages can be disregarded during the rebuilding of a logical-to-physical mapping table of the NVM system. FIG. 5 shows process 500 illustrating the rolling back of an NVM system in this manner. Process 500 may be performed by any suitable component of an NVM system such as, for example, by an NVM interface (e.g., NVM Interface 118 of FIG. 1) or suitable control circuitry (e.g., SoC Control Circuitry 112 of FIG. 1).

Process 500 can start at step 502. At step 504, the NVM system can examine a page of the NVM. At step 506, the NVM system may then determine whether the page examined at step 504 is valid or not. In response to the page being valid (e.g., the page is error-free), process 500 can proceed to a next page of the NVM at step 508. Depending on the particular layout of the NVM, this next page may, for example, be a page within the same block or a page within a different block. Process 500 may then continue to loop through steps 504, 506, and 508 to check pages of the NVM system until a corrupt page is identified.

When an invalid page is discovered at step 506, process 500 can proceed to step 510. The NVM system may then read the metadata of the pages within the NVM to determine a gap within the WSC sequence. This WSC gap value may thus correspond to a WSC value of the invalid page identified at step 506. At step 508, process 500 may then rollback the NVM system by disregarding any pages associated with a WSC value greater than this WSC gap value. For example, such pages may be considered incoherent and disregarded during a rebuilding of a logical-to-physical mapping table of the NVM system. Process 500 may then end at step 514.

When logical-to-physical mapping tables are rebuilt during a reboot operation, a time-order coherency is maintained. In some cases, the mapping table can be rebuilt by sequentially examining the pages in ascending order of WSC values. Generally, pages include their associated logical address stored within their metadata. The logical-to-physical mapping table may thus be rebuilt by examining such metadata. However, occasionally a page may include erroneous or outdated metadata that associates the page with an incorrect logical address. As an illustration, data associated with LBA X may be programmed to Page A. At a later point in time, new data associated with LBA X can be programmed to Page B, which may be located on a different block or super block. However, the metadata of Page A is never updated to reflect this changed logical addressing, and thus the metadata of Page A is outdated and erroneously indicates it is still associated with LBA X.

Consequently, if two pages are associated with the same logical address, then the page with the higher WSC value can be assumed to be the page with the most up-to-date user data and the correct logical address mapping. Thus, by examining the WSC values of the pages, the most recent version of a particular LBA can be recovered.

The logical-to-physical mapping tables can be rebuilt in a time-sequential order by following the WSC sequence in a replay of one or more pages of the NVM. As an illustrative scenario, a page associated with WSC=1 can indicate it is associated with LBA X. The logical-to-physical mapping table can be updated to include this information. However, when a page associated with WSC=12 is reached, the NVM system may identify that this page's metadata also indicates it is associated with LBA X. The NVM system may assume this page was written at a later point in time and thus has a more up-to-date logical address mapping. Thus, the page with WSC=12 overrides the previous page, and the logical-to-physical mapping table can be updated to indicate that the page with WSC=12 is associated with LBA X. This can be particularly important in maintaining coherent time-lines for systems having multiple write streams (e.g., dynamic and static write streams).

In addition to storing a WSC value in the metadata, a host weave sequence counter ("HWSC") value may also be stored in the metadata of each page of an NVM. Similar to the WSC values, the HWSC values can be sequential. However, as is explained in greater detail below, the HWSC may not necessarily be incremental. Each time new data is initially programmed to a page of the NVM (e.g., rather than being moved or reprogrammed for wear leveling purposes and the like), that page can be assigned a HWSC value. Unlike the WSC value which may change each time old data is moved to a new page, the HWSC value assigned to a particular set of data may never change. Instead, a particular set of data can maintain the same HWSC value throughout the course of its life within the NVM. In other words, since the HWSC values are sequential, they can indicate a general "age" of a file with regards to when that file was initially saved in the NVM. For example, the HWSC can indicate when a song file was first downloaded into a portable media player.

The particular HWSC value to assign to a page can be determined by equating the current WSC value to the page's HWSC value. As an example scenario, assume new Song File A is stored at Page X. The current WSC is 23, and thus Page X is assigned WSC=23 and HWSC=23. After a wear leveling process, WSC is now equal to 50. At this time, another new Song File B is stored at Page Y, and thus Page Y is assigned WSC=50 and HWSC=50 (thus, the HWSC values assigned to new data can be sequential, although not necessarily incremental). At a later point in time when the current WSC value is now 82, the data associated with Song File A is moved to Page Z (e.g., the data is moved for wear leveling, garbage collection, or the like). Page Z is assigned new WSC=82 and maintains old HWSC=23. Accordingly, even though the data associated with Song File A has been reprogrammed within the NVM, the system can still determine that Song File A is "older" than Song File B since it has a lower HWSC value. In other words, the HWSC can signify, for example, a relative "timestamp" of when a file or other data is first programmed into an NVM.

In some embodiments, the HWSC can aid the NVM system in determining the static-versus-dynamic status of pages. As used herein, the term "dynamic data" can refer to data that is updated or erased and reprogrammed relatively frequently. As an illustration, dynamic data can include data associated with a weather forecast program—such data may be frequently updated to reflect current weather conditions. On the other hand, as used herein, the term "static data" can refer to data which remains constant and unchanged for a relatively long period of time. As an illustration, static data can include a song file (e.g., an .mp3 file) which is stored in a portable media player device. Such data may generally remain unchanged throughout its life within the NVM. Similarly, the terms "dynamic page" and "static page" can refer to pages of an NVM storing dynamic and static data, respectively.

In particular, as described above, the HWSC can provide a general idea of how old the data stored within a page is. When data is older, it may be more likely that such data is static (e.g., since dynamic data generally only exists for a relatively short period of time before it is erased, and thus never reaches an "old" age). As is described in greater detail below, such static-versus-dynamic determinations can be useful in performing various NVM system operations, such as wear leveling and garbage collection.

To determine the general age of data stored within a page, the difference between the current WSC value and the HWSC value of that page can be calculated. If this difference is greater than a predetermined threshold value, then the data stored in that page can be considered static. If the difference is less than the threshold value, then the status of that data may, for example, be considered: dynamic data; recently-stored new data; or unknown (e.g., since it may be unknown whether this is dynamic data or merely recently-stored new static data).

In addition to or instead of using the HWSC values, various other techniques can be used to determine the static-versus-dynamic status of data. For example, the "file size" of a particular set of data can be examined. In some cases this can involve determining how many pages are used to store a particular file. The larger a file size, then the more likely it may be that the file is static. For example, the NVM system can determine that any file having a size greater than 10 pages (e.g., or greater than any other predetermined file size) is static. As another example, the NVM system can determine how much time was used to program a file into the NVM. The larger the amount of time used to program the file, the more likely it may be that such a file is static (e.g., since larger files may take a larger amount of time to program). As yet another example, various system heuristics can be monitored to determine the NVM system's behavior during the programming of the file. In this case, when the NVM system invests a relatively large amount of time and effort into programming a file, then the more likely it may be that such a file is static (e.g., since larger files may require more time and effort to program).

Figure 6:
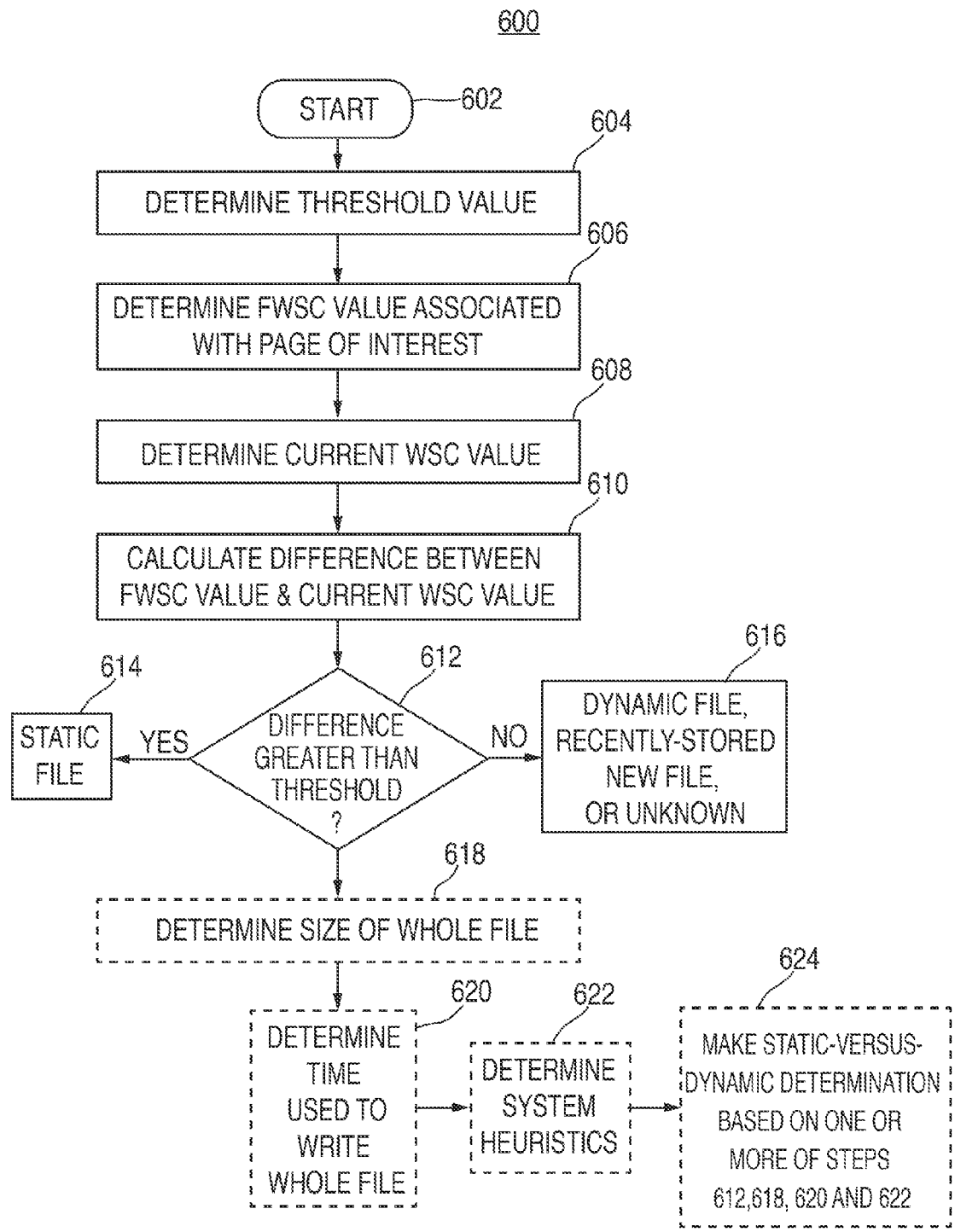
FIG. 6 is a flowchart of a static-versus-dynamic determination of pages of an NVM in accordance with various embodiment of the invention.

FIG. 6 shows process 600 for determining the static-versus-dynamic status of a page of an NVM system. Process 600 can start at step 602. At step 604 a threshold value can be determined. For example, the threshold value could be a predetermined value previously stored within the NVM system. At step 606, the HWSC value associated with the page of interest can be determined. For example, the HWSC value can be read from the metadata of the page of interest. At step 608, the current value of the WSC can be determined. The difference between the HWSC value and the current WSC value can then be calculated at step 610.

At step 612, the difference may then be compared to a threshold value which was determined at step 604. In response to the difference being greater than the threshold value, process 600 can proceed to step 614, and the page of interest can be identified as a static page. In other words, since the "age" of the page of interest is sufficiently old, it can be considered likely that this page is a static page.

However, in response to the difference not being greater than the threshold at step 612, process 600 can instead proceed to step 616. At step 616, one of several conclusions may result. For example, due to the relatively young age of the page of interest, process 600 may determine that this page is a dynamic page. As another example, process 600 may determine that the page of interest merely contains recently-stored new data (e.g., which may or may not be dynamic data). As yet another example, process 600 may consider the status of this page to be "unknown." In other words, it may not be known whether the page of interest is a dynamic page or merely a recently-stored static page.

In some embodiments, rather than proceeding to step 614 or step 616, process 600 may instead proceed to optional steps 618, 620, 622, and 624 after comparing the difference to the threshold at step 612. In this case, rather than basing the static-versus-dynamic determination solely on an examination of the HWSC, process 600 may jointly use one or more of the calculations in steps 618, 620, 622, and/or 624 to make the static-versus-dynamic determination.

For example, at step 618, the size of the whole file associated with the page of interest can be determined. In some cases, this step may involve identifying the number of pages used to store the whole file. As mentioned above, a large file size can indicate that the file is static. As another example, at step 620, the time required to write the whole file associated with the page of interest can be determined. Similar to step 618, a longer write-time can indicate that the file is static. As yet another example, at step 622, various system heuristics related to the whole file (e.g., time and effort used in writing the whole file) can be identified. At step 624, the static-versus-dynamic determination may then be made based on information determined in one or more of steps 612, 618, 620, and 622.

In some embodiments, a static-versus-dynamic determination, such as the one illustrated by process 600 of FIG. 6, can aid the NVM system in performing maintenance operations such as wear leveling and garbage collection. During wear leveling, user data can be moved in a NVM in order to try and maintain uniform wear of all blocks of the NVM. For example, static data can be moved to a high-cycle block (e.g., a block which has already been erased and programmed a relatively large number of times) and dynamic data can be moved to a low-cycle block (e.g., a block which has only been erased and programmed a relatively small number of times). Typically, wear leveling can be performed at certain intervals, such as when the NVM system is not busy and thus may not be negatively impacted by the additional processing requirements of the wear leveling operation. The system can use a garbage collection process to free up memory by moving valid data from programmed blocks to one or more erased blocks. Typically, a garbage collection process can be triggered when available memory is low or at any other time when there is a need to free up memory space.

Since the HWSC values can be used to determine static-versus-dynamic statuses on a page-per-page basis, the HWSC can also allow maintenance operations (such as wear leveling and garbage collection) to examine and separate data on a page-per-page basis. This can provide benefits over other systems which only separate or examine data on a block-per-block or superblock-per-superblock basis. As an illustration, FIG. 7 shows exemplary NVM system 700 in which data is separated on a page-per-page basis for a wear leveling operation (e.g., or for garbage collection or any other suitable operation).

Figure 7:
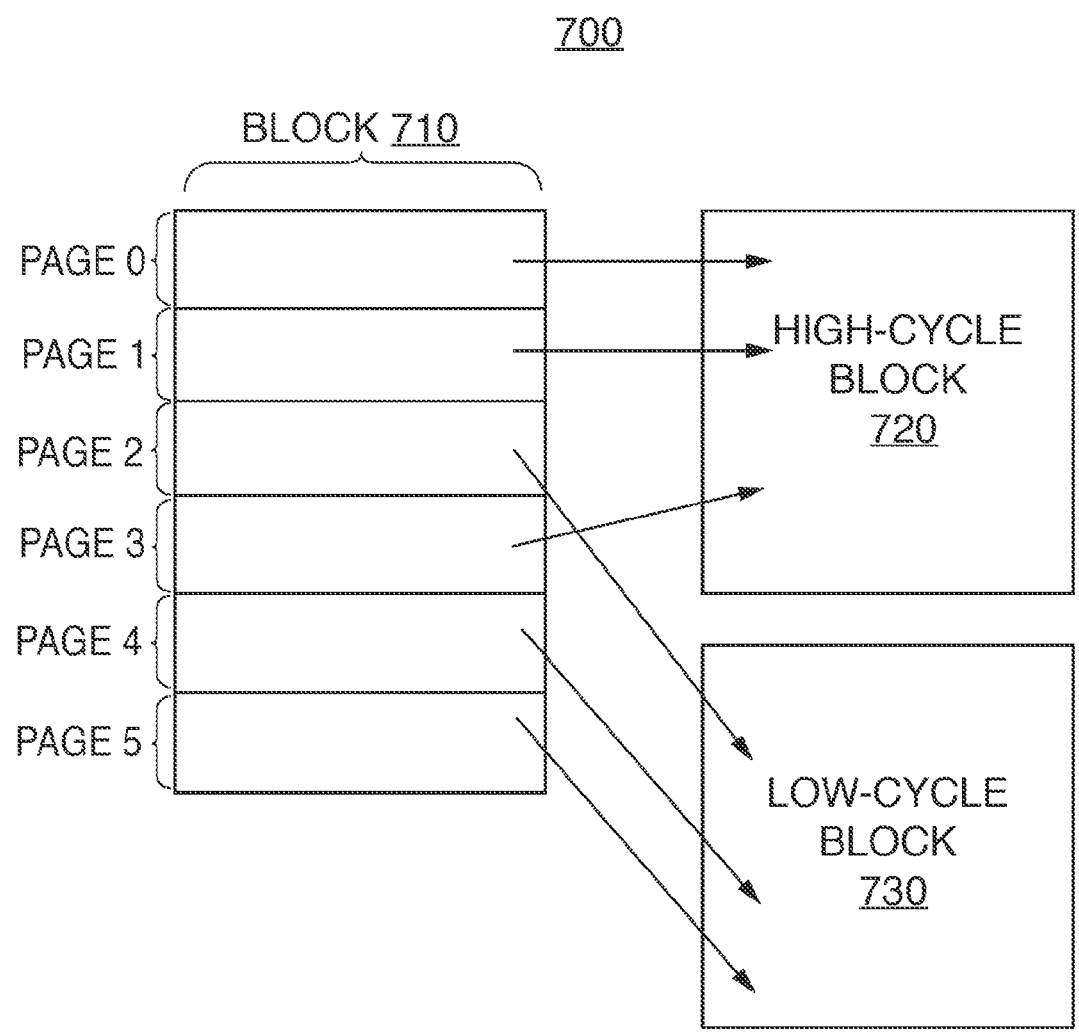
FIG. 7 is a function view of wear leveling in accordance with various embodiments of the invention.

As shown by FIG. 7, NVM system 700 can include block 710 having Pages 0-5. NVM system 700 can also include at least one high-cycle block 720 and at least one low-cycle block 730. For example, high-cycle block 720 can be a block which has previously undergone a relatively large number of write/erase cycles while low-cycle block 730 can be a block which has undergone a relatively small number or write/erase cycles.

Based on a suitable static-versus-dynamic determination process (e.g, process 600 of FIG. 6), each page of block 710 can be separately examined. Pages identified as static pages can be reprogrammed to high-cycle block 720, and pages identified as dynamic pages can be reprogrammed to low-cycle block 730. For example, FIG. 7 illustrates that Pages 0, 1, and 3 are identified as static pages and thus are rewritten to high-cycle block 720. Similarly, FIG. 7 illustrates that Pages 2, 4, and 5 are identified as dynamic pages and thus are rewritten to low-cycle block 730. Systems such as this, which separate data on a page-per-page basis, can provide enhanced accuracy and benefits over systems which merely separate data on a block-per-block basis.

Figure 8:
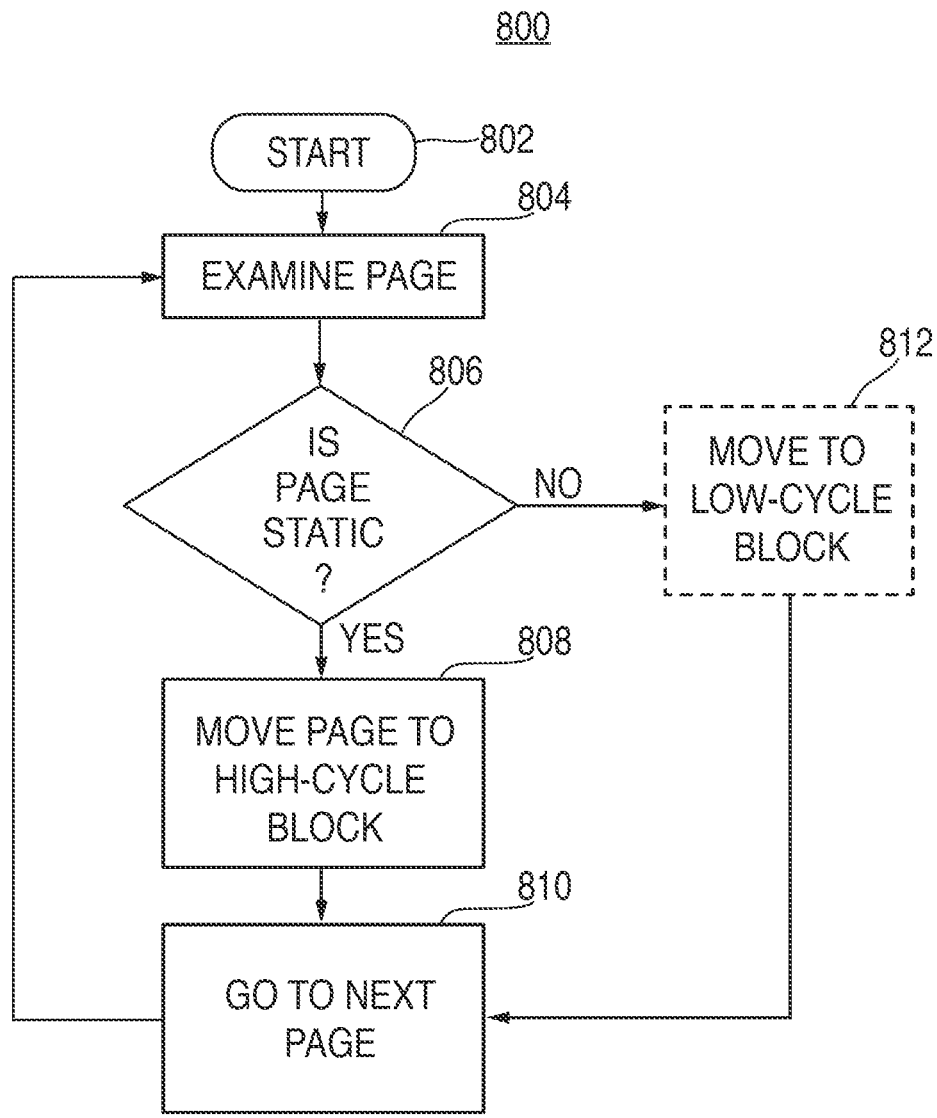
FIG. 8 is a flowchart of a wear leveling procedure in accordance with various embodiments of the invention.

FIG. 8 shows process 800 for separating data on a page-per-page basis. For example, process 800 may be used for separating data during a wear leveling operation, during a garbage collection operation, or during any other suitable operation of an NVM system.

Process 800 can begin at step 802. At step 804, a page of the NVM system can be examined to determine its static-versus-dynamic status. For example, the HWSC value of the page can be examined, the size of a file associated with the page can be examined, an amount of time taken to write the file associated with the page can be examined, any suitable system heuristics related to the page can be examined, or any combination of the above. At step 806, process 800 can determine whether the page is static based on the information obtained at step 804. For example, the difference between the HWSC value and a current WSC value can be compared to a threshold value. If this difference is greater than the threshold value, then the page may be identified as a static page.

In response to the page being identified as static at step 806, process 800 can proceed to stop 808. At step 808, the page can be moved (e.g., programmed into) a high-cycle block. Process 800 may then proceed to a next page in the NVM system at 810. Steps 804, 806, 808, and 810 may then be continuously looped in order to locate static pages and move them to a suitable high-cycle block.

In some embodiments, process 800 can proceed to optional step 812 in response to the page not being identified as static at step 806. In this case, the page can be moved to a low-cycle block. For example, optional step 812 may occur in scenarios where the page has been identified as a dynamic page (e.g., or the page is a likely candidate for being a dynamic page). Optional step 812 may be left out in cases where, for example, the static-versus-dynamic status of the data is unknown. As an illustration, this may occur when the difference between the HWSC and the WSC is beneath the threshold, and it is unknown whether this indicates the data is dynamic or merely recently-stored new static data.

It should be understood that processes 500, 600, and 800 of FIGS. 5, 6, and 8 may be executed by one or more components in a system (e.g., electronic device 100 of FIG. 1 or electronic device 200 of FIG. 2). For example, at least some of the steps in the processes may be performed by an NVM interface (e.g., NVM interface 118 of FIG. 1 or NVM interface 218 of FIG. 2). Persons skilled in the art will appreciate that one or more of the steps may be performed by a control circuitry (e.g., SoC control circuitry 112 of FIG. 1).

Furthermore, it should be understood that processes 500, 600, and 800 of FIGS. 5, 6, and 8 are merely illustrative. Any of the steps may be removed, modified, or combined, and any additional steps may be added, without departing from the scope of the invention.

The described embodiments of the invention are presented for the purpose of illustration and not of limitation.

What is claimed is:

1. A method for weaving a programming of pages of a non-volatile memory ("NVM"), the method comprising:
   identifying a current value of a weave sequence counter ("WSC"), wherein the WSC identifies a sequence in which each page of the NVM is programmed;
   programming a first page of a first block of the NVM with a first set of user data;
   associating the first page with the current value of the WSC;
   sequentially incrementing the WSC to an incremented WSC value;
   determining the first set of data is new data being initially stored in the NVM; and
   in response to the determining, associating the first page with a host weave sequence counter ("HWSC") value, wherein the HWSC value is equal to the current value of the WSC, wherein the HWSC is selectively updated after each page is programmed, and wherein the WSC and the HWSC are separate counters that are programmed into each page that contains user data, wherein the HWSC remains associated with the first set of data regardless of whether the first set of data is moved to another page such that HWSC serves as a timestamp as to when the first set of data was initially programmed into the NVM.

2. The method of claim 1, further comprising:
   programming a second page of a second block of the NVM with a second set of user data; and
   associating the second page with the incremented WSC value.

3. The method of claim 1, wherein the associating comprises programming the current value of the WSC into metadata of the first page.

4. The method of claim 1, wherein associating the first page with the HWSC value comprises programming the HWSC value into metadata of the first page.

5. The method of claim 1, further comprising:
   determining the first set of data is old data being moved from a different page in the NVM to the first page; and
   in response to the determining, associating the first page with a host weave sequence counter ("HWSC") value, wherein the HWSC value is equal to a HWSC value of the different page.

6. The method of claim 1, wherein sequentially incrementing the WSC comprises incrementing the current value of the WSC without rollover, such that the WSC continues to increment to a higher value throughout a life of the NVM.

7. The method of claim 1, wherein sequentially incrementing the WSC comprises incrementing the current value of the WSC with rollover, such that the value of the WSC rolls over to zero after a predetermined number of write cycles.

8. A method for wear leveling a non-volatile memory ("NVM") system, the method comprising:
   identifying a current weave sequence counter ("WSC") value, wherein the WSC value indicates an order in which pages of the NVM are programmed;
   identifying a host weave sequence counter ("HWSC") value for a particular page of the NVM, where the HWSC value indicates when data in the particular page was initially saved within the NVM, wherein the HWSC is selectively updated after each data page is programmed, and wherein the WSC and the HWSC are separate counters that are programmed into each page that contains user data, wherein the HWSC remains associated with that data regardless of whether the data is moved to another page such that HWSC serves as a timestamp as to when the data was initially programmed into the NVM;
   calculating a difference in value between the current WSC value and the ("HWSC") value; and
   based at least in part on the calculated difference, determining that the particular page is a static page suitable for moving to a high-cycle block.

9. The method of claim 8, wherein the determining comprises:
comparing the calculated difference to a predetermined threshold value;
determining the difference is greater than the threshold value; and
identifying the particular page as a static page in response to determining the difference is greater than the threshold value.

10. The method of claim 8, further comprising:
proceeding to a next page of the NVM and repeating the identifying a current WSC value, identifying a HWSC, calculating, and determining for the next page.

11. The method of claim 8, further comprising:
moving the data of the particular page to a new page of the high-cycle block; and
associating the HWSC value of the particular page with the new page.

12. The method of claim 8, further comprising:
moving the data of the particular page to a new page of the high-cycle block; and
associating the current WSC value with a WSC value of the new page.

13. The method of claim 8, wherein the determination that the particular page is a static page is further based on at least one of: a size of a file associated with the particular page; an amount of time taken to write the file associated with the particular page; and systems heuristics related to the file associated with the particular page.

14. The method of claim 8, wherein a static page comprises a page including data that remained unchanged for a relatively long period of time.

15. A memory interface for accessing a non-volatile memory ("NVM"), the memory interface comprising control circuitry operative to:
identify a particular set of data is to be programmed to the NVM;
determine a current value of a weave sequence counter ("WSC"), wherein the WSC indicates an order in which pages are programmed within the NVM;
direct the particular set of data to be programmed into a particular page of the NVM;
direct the current value of the WSC to be stored in metadata of the particular page;
sequentially increment the current value of the WSC to a next value;
direct a host weave sequence counter ("HWSC") to be stored in the metadata of the particular page;
set the value of the HWSC equal to the current value of the WSC in response to the particular set of data being new data initially programmed within the NVM such that HWSC serves as a timestamp as to when the particular set of data was initially programmed into the NVM. and wherein the HWSC remains associated with the particular set of data regardless of whether the particular set of data is moved to another page; and
set the value of the HWSC of the particular page equal to a previous HWSC value associated with the a previously programmed page containing the particular set of data in response to the particular set of data being old data moved from the previously programmed page, wherein the HWSC is selectively updated after each page is programmed, wherein the WSC and the HWSC are separate counters that are programmed into the metadata of each page that contains user data.

16. The method of claim 15, wherein the control circuitry is further operative to:
rebuild a logical-to-physical mapping table of the NVM by examining each page of the NVM in an time-sequential order following WSC values of each page of the NVM.

17. The method of claim 15, wherein the control circuitry is further operative to perform a rollback operation on the NVM by:
identify a corrupt page of the NVM that includes incoherent data;
determining a WSC value associated with the corrupt page; and
disregarding any page associated with a WSC value greater than the WSC value associated with the corrupt page.

18. The method of claim 17, wherein the disregarding any page comprises:
disregarding the any page during a rebuilding of a logical-to-physical mapping table of the NVM.

* * * * *